United States Patent
Cookson

[15] 3,704,643
[45] Dec. 5, 1972

[54] FLYING SHEAR
[72] Inventor: William Cookson, Fareham, England
[73] Assignee: Cookson Sheet Metal Developments Limited, Southampton, England
[22] Filed: Nov. 20, 1970
[21] Appl. No.: 91,373

[30] Foreign Application Priority Data
Nov. 25, 1969 Great Britain.....................57,644/69

[52] U.S. Cl........................................83/294, 83/319
[51] Int. Cl. ..............................................B23d 25/04
[58] Field of Search.................83/294, 293, 319, 320

[56] References Cited

UNITED STATES PATENTS

| | | | |
|---|---|---|---|
| 1,800,005 | 4/1931 | Braun | 83/294 |
| 2,582,025 | 1/1952 | Frank et al. | 83/294 X |
| 3,299,757 | 1/1967 | Schumacher et al. | 83/320 X |
| 2,301,236 | 11/1942 | Yoder | 83/320 X |
| 3,272,045 | 9/1966 | Cookson | 83/320 X |
| 2,341,870 | 2/1944 | Johnston | 83/293 |

Primary Examiner—James M. Meister
Attorney—Robert Scobey, Abraham Engel and Howard J. Churchill

[57] ABSTRACT

A flying shear suitable for cutting into predetermined lengths a moving supply of material for example metal sheet which may be a formed sheet passing from a roll forming machine. The flying shear comprises a shear blade assembly including shear blades between which the material can pass, means whereby the shear blade assembly is caused by the material to move forward with the material leaving a predetermined length of material in front of the blades, ram means to cause the blades to close together to cut the material, means responsive to the forward movement to cause the ram means to operate to effect the cut, means for opening the blades after the cut and means for retracting the blade assembly for another cut.

12 Claims, 9 Drawing Figures

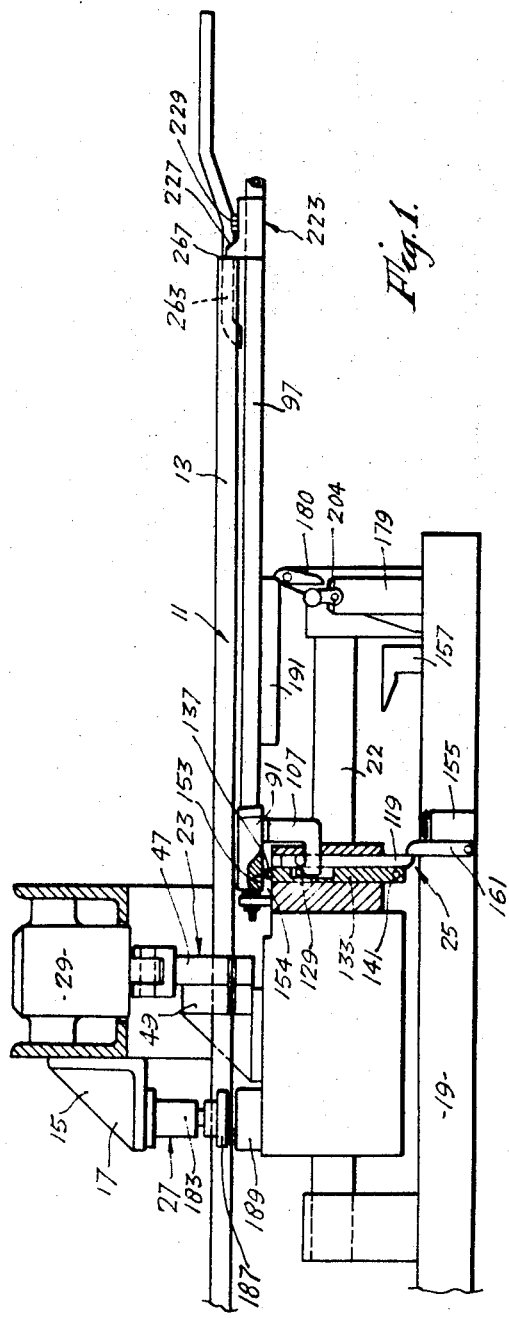
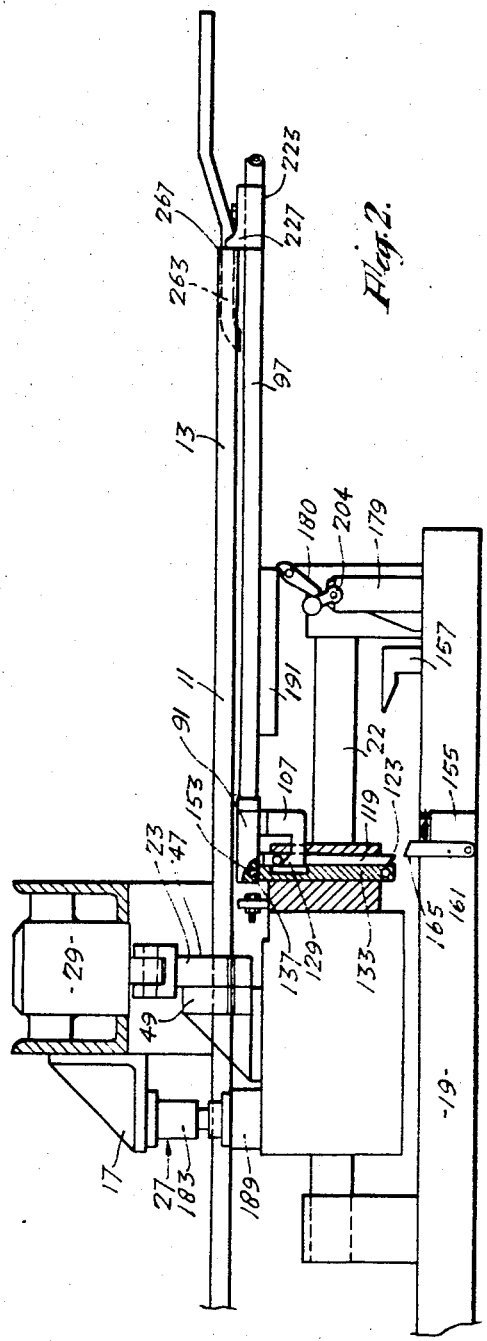

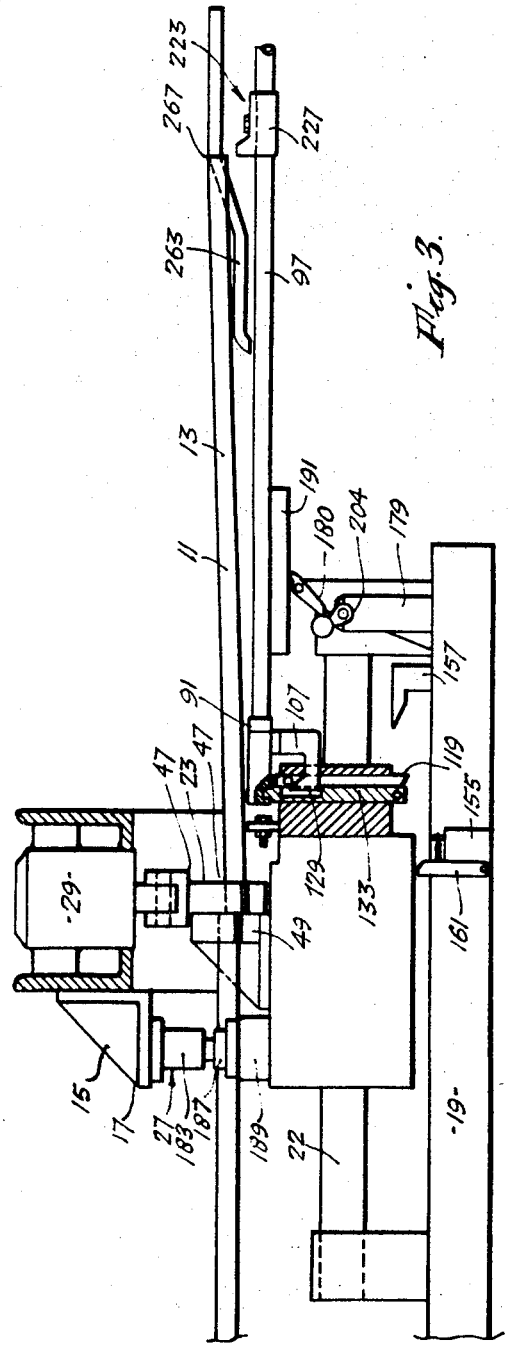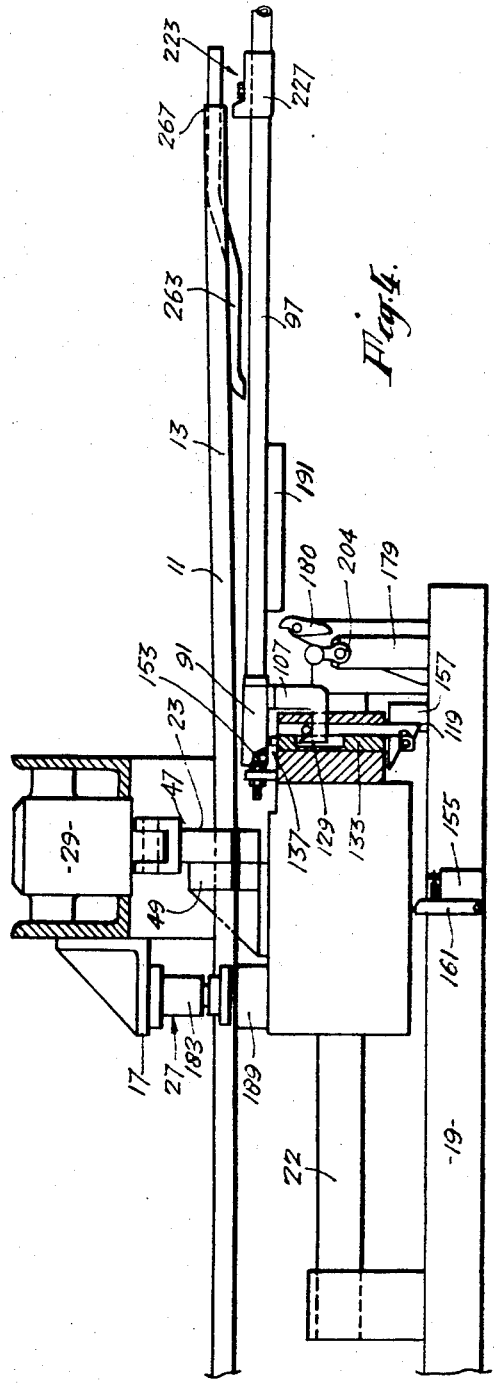

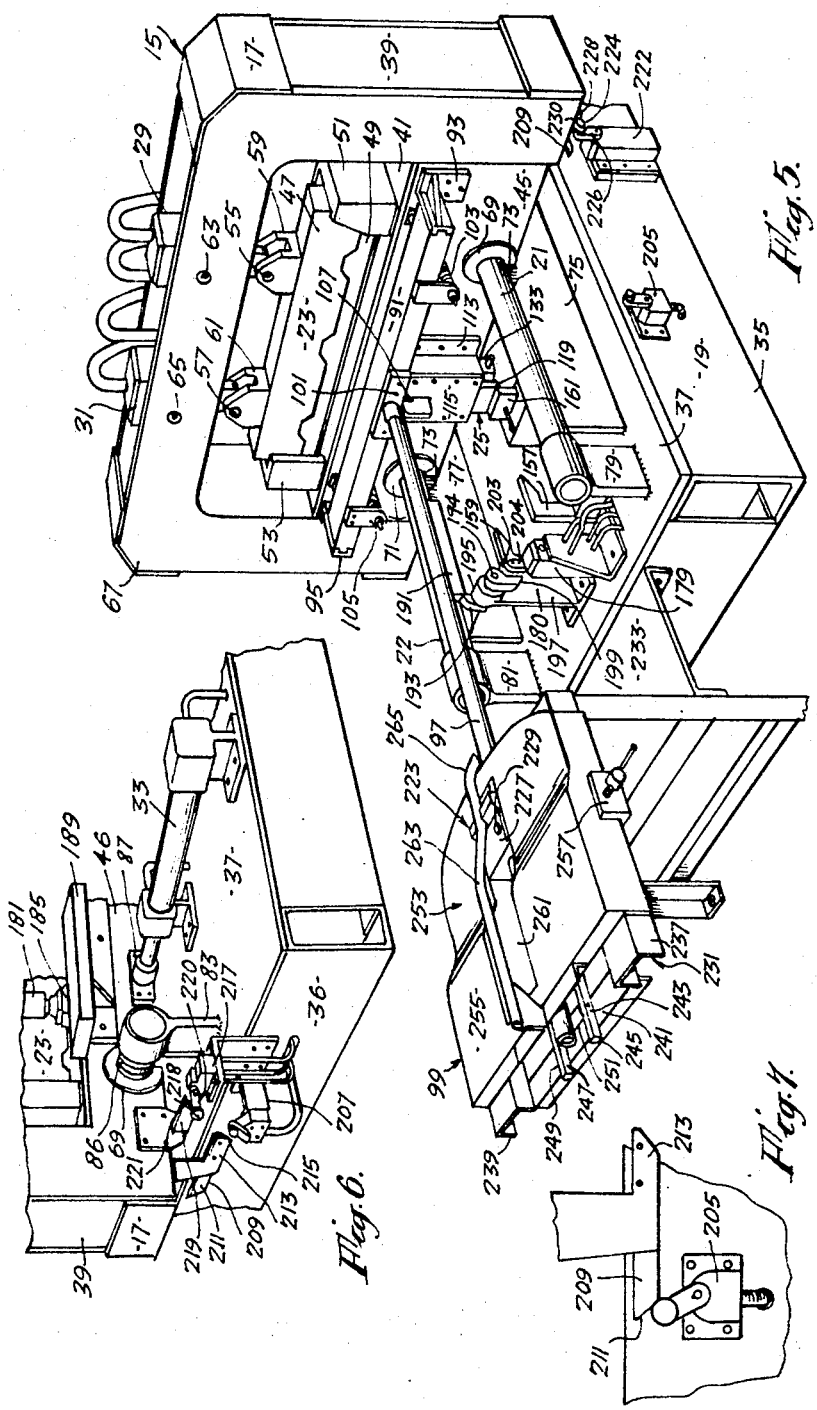

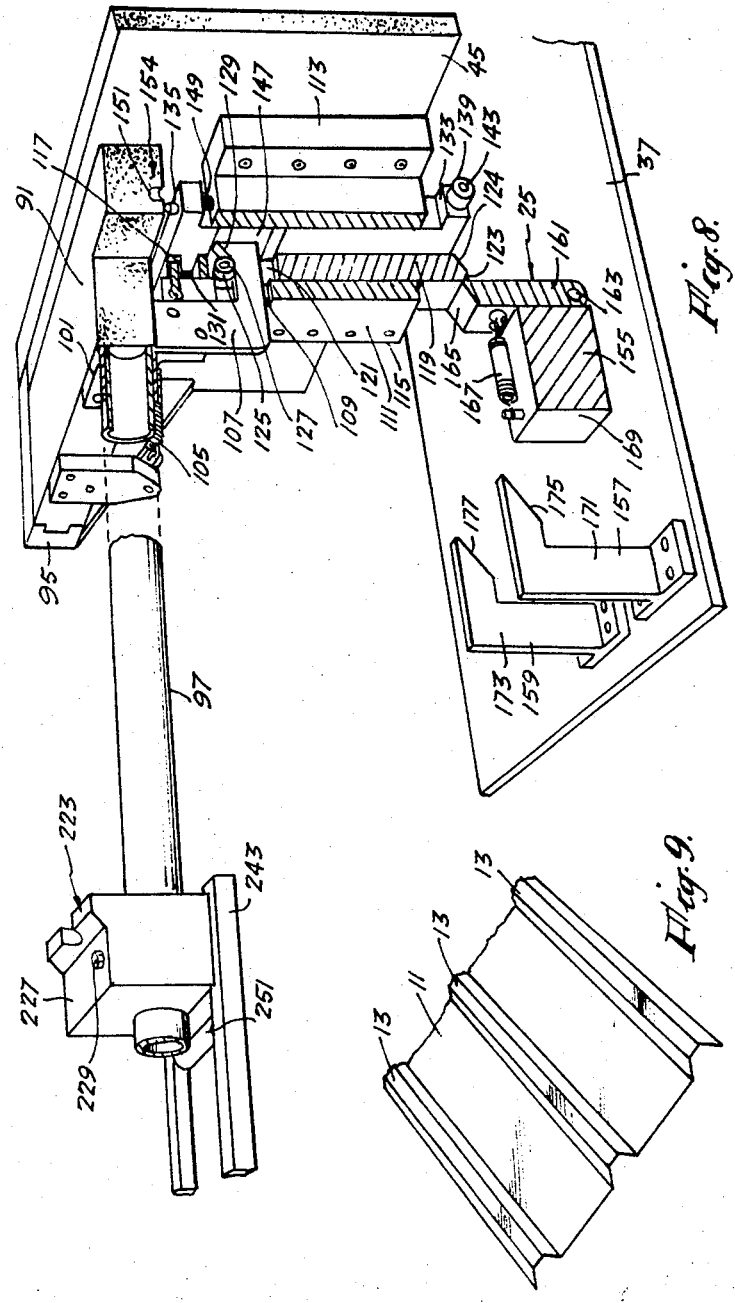

FLYING SHEAR

This invention relates to a flying shear for cutting into pre-determined lengths a rigid or semi-rigid material in the form of ribbon, rod, tube or sheet. Such a sheet may be plane or curved, angled or ribbed at one or more points in its cross section. Such material will be hereinafter referred to as "material of the kind described." The material of the kind described may be continuously produced from strip or coil in a roll forming machine.

According to the present invention there is provided a flying shear suitable for cutting into pre-determined lengths a moving supply of material of the kind described comprising a shear-blade assembly including shear blades between which the material can pass, means whereby the shear-blade assembly is caused by the material to move forward with the material leaving a pre-determined length of material in front of the blades, ram means e.g. hydraulic power ram means to cause the blades to close together to cut the material, means responsive to the forward movement of the material and shear blade assembly to cause the ram means to operate so that the predetermined length of material is cut during the forward movement, means for opening the blades after the cut and means for retracting the blade assembly for another cut.

The length of material in front of the shear blades may be determined by a stop connectable through engagement means to a movable mounting for the shear blades. The machine may include run-out means for the stop and for the material. The position of the stop and the run-out means for the material relative to the shear blades may be adjustable. Clamping means, the operation of which is responsive to the forward movement of the material and shear-blade assembly, may be provided to clamp the material behind the shear blades at least during a cut. They may take the form e.g. of pressure pads and a platen mounted for movement with the shear-blade assembly and controlled to grip the material during and after a cut so that the material behind the shear-blade assembly moves the assembly forward during the cut and after the cut until the clamping means are released.

The clamping is preferably simultaneous with the operation of the engagement means by which the stop is connected to the mounting for the shear blades. In the latter event, the moving material and the shear-blade assembly move forward as one entity with the predetermined length of material in advance of the shear blades, the shear blades then being actuated to cut off the predetermined length of material. Means may be provided to release cut-off lengths of material from the stop so that they run on to a run-out table.

Latching means may be provided to retain the shear-blade assembly in its starting position until released by the action of the leading edge of the material striking the stop which is connected to means for disengaging the latching means.

In this manner problems of cutting accurately pre-determined lengths of material of the kind described may be reduced or eliminated because the necessity for synchronizing the speed of the material with power operated cutting mechanisms of the flying shear does not arise.

One form of this invention will be described with reference to the accompanying drawings wherein:

FIG. 1 is a central longitudinal sectional elevation of a flying shear according to the invention (some parts being omitted for clarity) prior to a length of formed sheet metal being cut;

FIG. 2 is a view similar to that shown in FIG. 1 with a flying shear latching means unlatched and clamping means locking the material to a shear blade assembly;

FIG. 3 is a view similar to that shown in FIG. 1 immediately after the material is cut as the material moves along a run-out table;

FIG. 4 is a view similar to that shown in FIG. 1 with the length of material released from the flying shear prior to the shear-blade assembly being returned to the latched position shown in FIG. 1;

FIG. 5 is a perspective view of the flying shear shown in FIG. 1 with further detail of stop means on a run-out table;

FIG. 6 is a part perspective view of the flying shear behind the cutting blades;

FIG. 7 is a fragmentary elevation view of a hydraulic switch mechanism;

FIG. 8 is an enlarged part perspective section view of latching means; and

FIG. 9 is a part perspective view of sheet metal which may be cut by the machine shown in the previous drawings.

In FIG. 1 a formed sheet metal sheet 11 having ribs 13, also shown in FIG. 9, has passed through forming rolls of a roll forming machine (not shown). The sheet 11 is cut off to pre-determined lengths in the flying shear which is generally indicated at 15. The flying shear 15 essentially comprises a movable frame 17 slidable along shafts 21 and 22 (see also FIG. 5) which are mounted on a bed 19, a cutting device 23, latching means 25, clamping means 27, hydraulic ram means 29 and 31 for operating cutting device 23 and hydraulic ram 33 for return movement of the movable frame and connected parts (FIG. 6). It further comprises stop means 223 linked to latching means 25 and to engagement means 154. Movable frame 17 and connected parts (including cutting device 23) will be referred to as the shear-blade assembly. Forward movement of this assembly is by means subsequently explained.

Referring to FIGS. 5 and 6 the bed 19 is preferably made from steel side channels 35 and 36 and a base plate 37. The movable frame 17 is made from steel comprising an opened-sided structure 39 having a support plate 41 situated over front and back plates 45 and 46. On support plate 41 is mounted the cutting device 23 comprising a profiled blade 47 and a co-operating profiled blade 49 (see also FIG. 1) with blade 47 slidably mounted in end guides 51 and 53. Top blade 47 is pivotably connected by pivots 55 and 57 and brackets 59 and 61 to the hydraulic rams 29 and 31 secured by pivots 63 and 65 in a top portion 67 of the movable frame 17. Blades 47 and 49 are shaped to the profile of formed sheet 11.

In plates 45 and 46 are secured two ball linear bushings 69 and 71 (see FIGS. 5 and 6). The bushings are provided with slots 73.

Bushings 69 and 71 slide over the shafts 21 and 22 which are secured to the base plate 37 by longitudinal plate supports 75 and 77 and end supports three of which are shown at 79, 81, 83 in FIGS. 5 and 6, a fourth, for shaft 22, opposite end support 81, being omitted from FIG. 6. Between end support 83 and the said fourth end support and the opposed ends of bushings 69, 71 are provided compression springs 86. One only is shown in the drawings (FIG. 6). Slots 73 in bushings 69 and 71 provide clearances for the bushings to clear plate supports 75 and 77. On the base plate 37 behind the cutting device 23 is mounted the hydraulic ram 33 secured to the back plate 46 by a rod end connection 87.

In FIGS. 1, 5 and 8 latching means 25 for retaining the shear-blade assembly in its starting position comprises a slidable table 91, a cam plate 107, an upper slidable latch 119, and a lower rotatable latch 161. The slidable table 91 is slidable in end guides 93 and 95 secured to the front plate 45. A connecting element in the form of a central tube 97 on which is mounted stop means 223 is slidable on run-out means 99 (FIG. 5). The tube 97 is connected to the table 91 by a tube end connection 101. Provided between the table 91 and plate 45 are two extension spring devices 103 and 105. As shown by the cut-away half section in FIG. 8 (in which the latching means 25 is in the engaged position when the shear-blade assembly is in the non-operative position) the cam plate 107 is secured to the slidable table 91. The cam plate 107 is slidable in a slot 109 provided in latch cover 111 secured to front plate 45. Latch cover 111 comprises two flanged side plates 113 and a front cover plate 115. Secured to the top of front plate 115 is a top plate 117. Behind the front plate 115 is the upper slidable latch 119 which is provided with a slot 121 towards its top end and a locking edge 123 and bevel 124 at its bottom end. In the slot 121 is provided a roller 125 mounted on a shaft 127 the roller engaging a cam profile 129 of the cam plate 107 as shown. Between the top end of the latch 119 and the top plate 117 is provided a compression spring 131.

On the base plate 37 of the bed 19 is provided a lower rotatable latch 161 pivoted on a shaft 163 (bearings are not shown for clarity). The upper end of latch 161 is bevelled and has a locking edge 165 behind which is located locking edge 123 of the upper latch 119. An extension spring device 167 is provided, on a block 155 positioned against the latch 161 as shown.

Between the slidable latch 119 and front plate 45 is provided cam plate 133 in the top end of which are provided two plugs 135 and 137 (the latter seen in FIG. 1), and at the bottom end a roller 139 mounted on a shaft 143 (FIG. 8) and a roller 141 (FIG. 1) mounted on a similar shaft. Near the top end of the cam plate 133 is provided a recess 147 to give clearance for the cam plate 107 and compression springs (one of which is shown at 149) are provided between a top portion of cam plate 133 and side plates 113. In the base of slidable table 91 lying adjacent to plugs 135 and 137 in the position shown in FIGS. 1 and 8 are sockets 151 (FIG. 8) and 153 (FIG. 1). The plugs 135,137 and the slidable table 91 with its sockets 151,153 comprise engagement means, generally indicated by the reference 154, to which stop means 223 later described is linked and by means of which it may draw forward the shear-blade assembly. Referring to FIGS. 5 and 8, cam devices 157 and 159 comprise cam plates 171 and 173 secured to base plate 37 provided with bevelled front edges 175 and 177.

In FIGS. 1, 5 and 6 clamping means 27 comprise a hydraulic valve 179 controlled by a cam device 180 which actuates a pair of hydraulic rams 181 and 183 situated behind cutting blade device 23. Rams 181 and 183 are provided with pressure pads 185 and 187 positioned above a platen 189 secured to the back plate 46 of the frame 17 to clamp planar elements of ribbed sheet 11 between ribs 13. The cam device 180 (see FIG. 5) comprises a trigger blade 191 secured under the central tube 97 which co-operates with a lever 193 on one end of a shaft 194 in a bearing 195 which is mounted on a bracket 197 secured to base plate 37. A second lever 199 is also provided on shaft 194 which contacts a roller 203 provided for actuating a lever 204 on hydraulic valve 179.

On side channel 35 is provided a mechanism for controlling the hydraulic ram 33 (see FIGS. 5, 6 and 7) comprising a first electric limit switch 205 and a second switch 207. Switch 205 is actuated by a plate cam 209 with a bevelled end 211 provided under frame 17 as shown in FIG. 6 and 7. In FIG. 6, switch 207 is actuated by a second plate cam 213 with a bevelled end 215, secured to plate cam 209. Adjacent to switch 207 a hydraulic valve 217 operated by a roller 218 and a lever 220 on side channel 35 is actuated by a plate cam 219 with a bevelled end 221 provided on back plate 46 of frame 17. In the non-operative position of the shear-blade assembly the bevelled end 221 of plate cam 219 is in contact with roller 218 which holds the valve open and partially depressurises the hydraulic system.

Also provided on side channel 35 is a hydraulic valve 222 actuated by a one-way roller 224 and lever 226 for operating hydraulic rams 29 and 31 by plate cam 228 having a bevelled end 230.

In FIGS. 1, 5 and 8 stop means 223 movable on run-out means 99 include an adjustable stop block 227 slidable along central tube 97 and securable thereto at a desired pre-determined distance from cutting blade 49 by a screw 229. (see FIG. 8). Run-out means 99 as shown in FIG. 5 provides run-out means for the central tube 97 and the stop means 223, as well as for the advancing sheet both prior to and after a cut has been made. The means 99 includes a frame structure 231 connected by a junction piece 233 to the bed 19 of the flying shear. The frame structure 231 comprises side channel rails 237 and 239 joined at intervals by lateral channels 241. secured to channels 241 is a roller device 243 with side bars 245 and 247 providing a frame 249 in which are situated at convenient intervals rollers 251 along which central tube 97 and block 227 can freely move, see also FIG. 8.

Run-out means 99 further include material support and releasing means indicated generally at 253 in FIG. 5. They comprise an adjustable run-out table 255 and mounted thereon a curved tubular device 263 in the form of a ramp with its front end 265 downwardly bent adjacent to tube 97. The device 263 provides means to release the front end of the sheet from the stop means 223. Side clamps are provided for adjustably securing table 255 to rails 237 and 239. One such clamp is shown at 257. Stop block 227 is received within a slot 261 in the table 255 and moves along the slot in response to the movement of the leading edge of the sheet material until the latter is released by releasing device 263.

In FIG. 1 the shear blade assembly and stop means 223 are shown in the non-operative position at the start of the cutting cycle. Formed sheet 11 is shown in FIG. 1 after it has passed out of the roll forming machine through the opened cutting blades 47 and 49 of the flying shear with its front end (leading edge) 267 just touching the front face of the stop block 227. Stop block 227 is secured at a pre-determined distance from the face of cutting blade 49 on the central tube 97 by the screw 229 and the table 255 clamped to frame structure 231 by clamps 257 and 259 at an appropriate position (see FIG. 5).

The shear blade assembly is prevented from forward movement by being latched in its stationary position by the engagement of the locking edge 123 of the upper slidable latch 119 behind the locking edge 165 of the lower rotatable latch 161. It will be noted that plugs 135 and 137 of the cam plate 133 are out of engagement with the sockets 151 and 153 in the slidable table 91 (see FIG. 8).

In FIG. 2 the end 267 of formed sheet 11 has struck the stop block 227 causing it to start to move along slot 261 of table 255 (see FIG. 5) and pull central tube 97 along the rollers 251 shown in FIGS. 5 and 8. This action causes the slidable table 91 of latching means 25 to slide forward in guides 93 and 95 and to open extension springs 103 and 105 with cam plate 107 causing roller 125 to run up the cam profile 129 compressing spring 131 and so lifting the locking edge 123 of upper latch 119 free from engagement with the locking edge 165 of lower latch 161. As table 91 slides forward plugs 135 and 137 spring into engagement with sockets 151 and 153 by the lifting of cam plate 133 so securely locking table 91 and stop block 227 of stop means 223 to the shear blade assembly. At the same time the trigger blade 191 of cam device 180 through levers 193 and 199 actuate through roller 203 and lever 204 to open hydraulic valve 179 so as to operate rams 181 and 183 of the clamping means 27 (see FIG. 6) by pressure to force pressure pads 185 and 187 to clamp formed sheet 11 on to platen 189. The shear blade assembly, the stop means 223 and the pre-determined length of formed metal 11 are now locked together as one entity with the blades 47 and 49 of cutting device 23 open as the shear-blade assembly moves along shafts 21 and 22, the movement being initially assisted by compression springs 86. As the shear-blade assembly starts to move, the plate cam 219 is released from roller 218 of hydraulic valve 217 so closing the valve and fully pressurizing the hydraulic system.

The shear-blade assembly during its movement causes the bevelled end 230 of plate cam 228 to actuate roller 224 and lever 226 of hydraulic valve 222 causing this to open during the forward movement of the shear device to operate rams 29 and 31 and thus actuate the cutting blade device 23 to cut off the predetermined length of formed sheet 11 as shown in FIG. 3. After the cutting action plate cam 228 clears roller 224 and lever 226 of valve 222 allowing lever 226 to return to its non-operative position and so allowing pressure oil through valve 222 to operate rams 29 and 31 in an upward direction thereby opening the cutting blade device 23 after it has made the cut in sheet 11.

The front end 267 of sheet 11 as shown in FIG. 3 has run up the tubular device 263 so causing the end to be freed from stop block 227 immediately after the cut has been made.

In FIG. 4 front end 267 has passed over the stop block 227 enabling the sheet to be removed from the run-out table 225. At the same time the cam devices 157 and 159 on base plate 37 of bed 19 (see FIGS. 5 and 8) engage rollers 139 and 141 causing cam plate 133 to retract and cause plugs 135 and 137 to be withdrawn from sockets 151 and 153. This action has the effect of allowing extension spring devices 103 and 105 to return the slidable table 91 to its original position (the end of the sheet 11 being no longer in contact with the block 227) in the process releasing rollers 139 and 141 from cam devices 157 and 159 and allowing the slidable latch 119 to drop by backward movement of the cam plate 107. At the end of the travel of the shear-blade assembly trigger blade 191 of cam device 180 has cleared hydraulic valve 179 releasing rams 181 and 183 from clamping sheet 11 on platen 189. Also limit switch 205 is operated by plate cam 209 (see FIG. 7) which energizes by a relay a solenoid valve (not shown) which causes pressure oil to operate the hydraulic ram 33 and so retract the shear-blade assembly. Simultaneously the assembly is retracted plate cam 228 contacts roller 224 and lever 226 but does not actuate valve 222 because of the one-way action of lever 226.

As the assembly is retracted the bevel 124 of slidable latch 119 engages the bevelled edge 165 of rotatable latch 161 and rotates this downwardly out of the path of slidable latch 119. Extension spring 167 thereafter returns the latch 161 to its original position (see FIG. 8).

The shear blade assembly at the end of its return stroke compresses springs 86 (see FIG. 6) and limit switch 207 is operated by plate cam 213 to de-energize via the relay the solenoid valve; simultaneously the hydraulic valve 217 is operated by plate cam 219 to depressurize the hydraulic system. The shear blade assembly thereafter moves forward under the action of springs 86 until latches 119 and 161 again engage each other to complete the cycle of operations.

What is claimed is:

1. A shear for cutting into predetermined lengths a moving supply of material of the kind described, having
    a. a carriage movable in a forward and return movement along the line of travel of the material,
    b. cooperating shear blades on the carriage between which the material passes,
    c. means to close the blades to cut the material during the forward movement of the carriage and means to open the blades after the cut,
    d. a movable stop to be struck and driven forward along a path by a leading end of the material,
    e. a latch to restrain the carriage from forward movement, and means operated by the stop when struck by the material to release the latch,
    f. an inextensible linkage between the stop and the carriage whereby the stop, while being driven forward by the material, pulls the carriage in the forward movement, the carriage and the stop being spaced apart by a predetermined distance, said linkage including provision for a lost motion between the stop and the carriage immediately after the stop is struck by the material,
    g. driving means for the carriage to accelerate the carriage during the said lost motion, and h. a fixed cam surface adjacent the path of forward movement of the stop to be engaged by the said leading end of the material and to cause relative motion of the stop and the said leading end so that the material disengages from the stop.

2. A shear according to claim 1 wherein the said inextensible linkage includes, in order to provide the said lost motion, a first member connected to the stop and a second member connected to the carriage, the said first and second members mutually engaging after a short relative movement of the first member past the second member on the stop being struck by the material to prevent any further such relative movement, whereby an inextensible connection between the stop and the carriage is provided after the lost motion.

3. A shear according to claim 2 wherein one of the said first and second members is biased by a spring against the other said member and the two said members have mutually opposed surfaces which engage after the said lost motion.

4. a shear according to claim 3 having stationary cam surfaces, the said biased member having cam follower surfaces which engage the said cam surfaces after a length of material has been cut, the said cam surfaces and said cam follower surfaces interacting to move said biased member against the bias to disengage the said first and second members.

5. A shear according to claim 1 wherein the latch comprises a stationary member and a member mounted on the carriage and movable relative to the carriage which engages the said stationary member to prevent the said forward movement of the carriage, the said movable member on the carriage having cam follower surfaces, there being a member connected to the stop having cam surfaces which engage said cam follower surfaces of the movable member whereby, when the stop is struck by the leading end of the material, the said movable member is moved so as to disengage from the said stationary member.

6. A shear according to claim 1 wherein the said fixed cam surface adjacent the path of forward movement of the stop is an upper surface of a fixed rod which upper surface slopes upwardly in the direction away from the carriage, the stop having a slot in which the rod is located, the said sloping upper surface rising above the path of movement of the stop, whereby the leading end of the material engages the said sloping portion and, travelling up it, is lifted off the stop.

7. A shear according to claim 1 having clamping means mounted on the carriage for clamping the material during cutting on the side of the blades further from the stop, the material remaining clamped until the leading end of the cut off length of material has disengaged from the stop.

8. A shear according to claim 1 wherein said driving means for the carriage is at least one spring which is compressed by the return movement of the carriage.

9. A shear according to claim 8 wherein the clamping means include pressure pads and a platen mounted for movement with the shear-blade assembly and controlled to grip the material during and after a cut.

10. A shear according to claim 9 wherein the shear blades are suitable for cutting into predetermined lengths a moving supply of ribbed sheet material having planar elements between the ribs and wherein the pressure pads are arranged to engage the planar elements and clamp them to the platen.

11. A shear according to claim 1 wherein the said means to close the blades to cut the material comprises at least one hydraulic ram mounted on the carriage.

12. A flying shear suitable for cutting into predetermined lengths a moving supply of material of the kind described comprising a movable shear-blade assembly including shear blades between which the material can pass, ram means to cause the blades to close together to cut the material, means responsive to the forward movement of the material and shear-blade assembly to cause the ram means to operate so that the predetermined length of material is cut during the forward movement, means for opening the blades after the cut and means for retracting the blade assembly for another cut, means whereby the shear-blade assembly is caused by the material to move forward with the material leaving a predetermined length of material in front of the blades including a stop for the material in front of the shear blades, the stop being connectable through engagement means to the movable shear blade assembly so that when the stop and the movable mounting are connected the predetermined length of material lies between the stop and the blades, the said engagement means including a connecting element on which the stop is adjustably mounted, there being run-out means for the connecting element so that the stop can run out in advance of the movable shear blade assembly, the run out means including a run-out table for the material having a slot in which the stop moves.

* * * * *

UNITED STATES PATENT OFFICE
CERTIFICATE OF CORRECTION

Patent No. 3,704,643    Dated December 5, 1972

Inventor(s) WILLIAM COOKSON

It is certified that error appears in the above-identified patent and that said Letters Patent are hereby corrected as shown below:

Column 7, Claim 4, line 1, "a" should read --- A ---

Column 8, Claim 9, line 1, "8" should read --- 7 ---

Signed and sealed this 22nd day of May 1973

(SEAL)
Attest:

EDWARD M. FLETCHER, JR.
Attesting Officer

ROBERT GOTTSCHALK
Commissioner of Patents